United States Patent
Takao

(10) Patent No.: US 10,190,927 B2
(45) Date of Patent: Jan. 29, 2019

(54) TACTILE SENSOR AND METHOD FOR EVALUATING TOUCH FEELING

(71) Applicant: NATIONAL UNIVERSITY CORPORATION KAGAWA UNIVERSITY, Kagawa (JP)

(72) Inventor: Hidekuni Takao, Kagawa (JP)

(73) Assignee: NATIONAL UNIVERSITY CORPORATION KAGAWA UNIVERSITY, Kagawa (JP)

(*) Notice: Subject to any disclaimer, the term of this patent is extended or adjusted under 35 U.S.C. 154(b) by 214 days.

(21) Appl. No.: 15/123,410

(22) PCT Filed: Mar. 2, 2015

(86) PCT No.: PCT/JP2015/001073
§ 371 (c)(1),
(2) Date: Sep. 2, 2016

(87) PCT Pub. No.: WO2015/133113
PCT Pub. Date: Sep. 11, 2015

(65) Prior Publication Data
US 2017/0067789 A1    Mar. 9, 2017

(30) Foreign Application Priority Data
Mar. 3, 2014 (JP) .................... 2014-040189

(51) Int. Cl.
*G06F 11/00* (2006.01)
*G01L 5/00* (2006.01)
(Continued)

(52) U.S. Cl.
CPC .............. *G01L 5/0038* (2013.01); *G01B 5/28* (2013.01); *G01B 7/18* (2013.01); *G01L 1/18* (2013.01)

(58) Field of Classification Search
CPC .................................................... G01L 5/0038
See application file for complete search history.

(56) References Cited

U.S. PATENT DOCUMENTS

| | | |
|---|---|---|
| 7,481,121 B1 | 1/2009 | Cao |
| 2011/0277543 A1 | 11/2011 | Mies |

(Continued)

FOREIGN PATENT DOCUMENTS

| | | |
|---|---|---|
| JP | S54-150161 A | 11/1979 |
| JP | S61-84711 A | 4/1986 |

(Continued)

OTHER PUBLICATIONS

International Search Report for PCT/JP2015/001073, dated May 19, 2015.

(Continued)

*Primary Examiner* — Phuong Huynh

(57) ABSTRACT

To provide a tactile sensor that allows a contact to be displaced largely and can detect fine ruggedness, flexibility, and other features of a surface of a measuring object.

A sensor part S includes a frame 10 that includes a side part of a substrate B, a contact 20 that is disposed in parallel to the substrate B so that a tip of the contact 20 projects from a side face of the substrate B, a suspension 30 that supports the contact 20 to the frame 10, and displacement detectors 41 and 42 each of which detects displacement of the contact 20. The side face of the substrate B functions as a sensing surface. The contact 20 coming in contact with a measuring object O is displaced on a level parallel to the substrate B. Since the sensor part S can be configured widely in a planar manner along the substrate B, the structure has higher flexibility of design. As a result, the sensor part S allows the (Continued)

contact 20 to be displaced largely, and can detect fine ruggedness, flexibility and other features of the surface of the measuring object O.

11 Claims, 16 Drawing Sheets

(51) Int. Cl.
  *G01B 5/28* (2006.01)
  *G01L 1/18* (2006.01)
  *G01B 7/16* (2006.01)

(56) References Cited

U.S. PATENT DOCUMENTS

| | | | |
|---|---|---|---|
| 2012/0202009 A1* | 8/2012 | Motofuji | B29C 33/3857 |
| | | | 428/156 |
| 2014/0007705 A1* | 1/2014 | Campbell | G01L 1/148 |
| | | | 73/862.628 |

FOREIGN PATENT DOCUMENTS

| | | |
|---|---|---|
| JP | S62-027612 A | 2/1987 |
| JP | H01-195301 A | 8/1989 |
| JP | 2001-349823 A | 12/2001 |
| JP | 2003-106988 A | 4/2003 |
| JP | 2004-163166 A | 6/2004 |
| JP | 2006-208248 A | 8/2006 |
| JP | 2011-188921 A | 9/2011 |
| JP | 2013-170896 A | 9/2013 |
| SU | 1242746 A1 | 7/1986 |
| WO | 2011/048988 A1 | 4/2011 |

OTHER PUBLICATIONS

Written opinion of the International Searching Authority for PCT/JP2015/001073, dated May 19, 2015.

European Patent Office, Partial Supplementary European Search Report for EP patent application No. 15758517.5, dated Dec. 19, 2017.

Europe Patent Office, Official Communication for European Patent Application No. 15758517.5-1001, Sep. 26, 2018.

Hirzinger G et al., "Multi-sensor-system fur robter", TM-Technisches messen /Plattform fur methiden, systeme und anwandungen der messtechnik, R. Oldenbourg verlag, Munchen, DE, vol. 53, No. 7/08, Jan. 1, 1986, pp. 286-292, XP000003877, ISSN:0171-8096 (Cited in the Official Communication (Cite No. 1 of Non-Patent Literature Document in this list)).

\* cited by examiner

FIG. 2
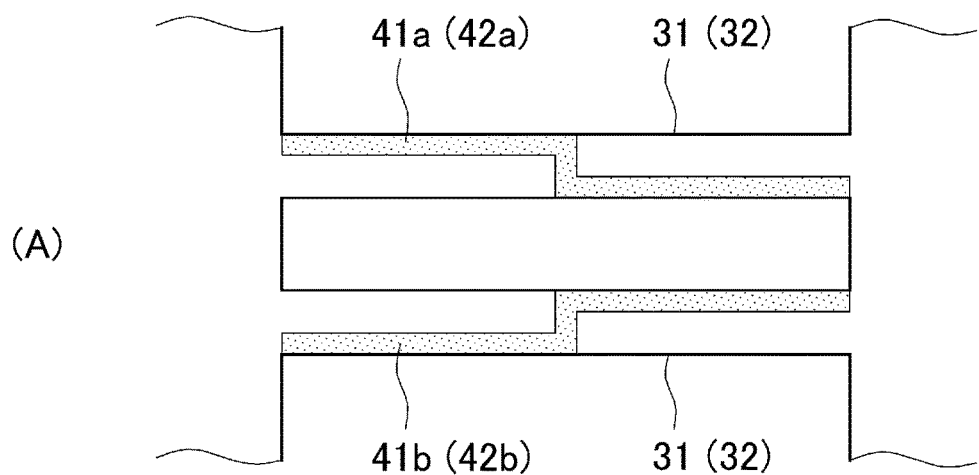
(A)
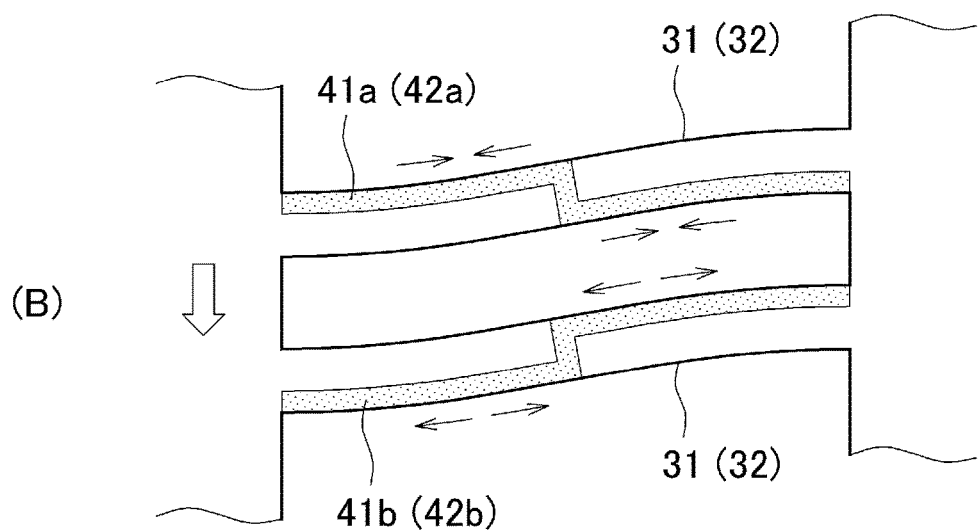
(B)

F I G. 4
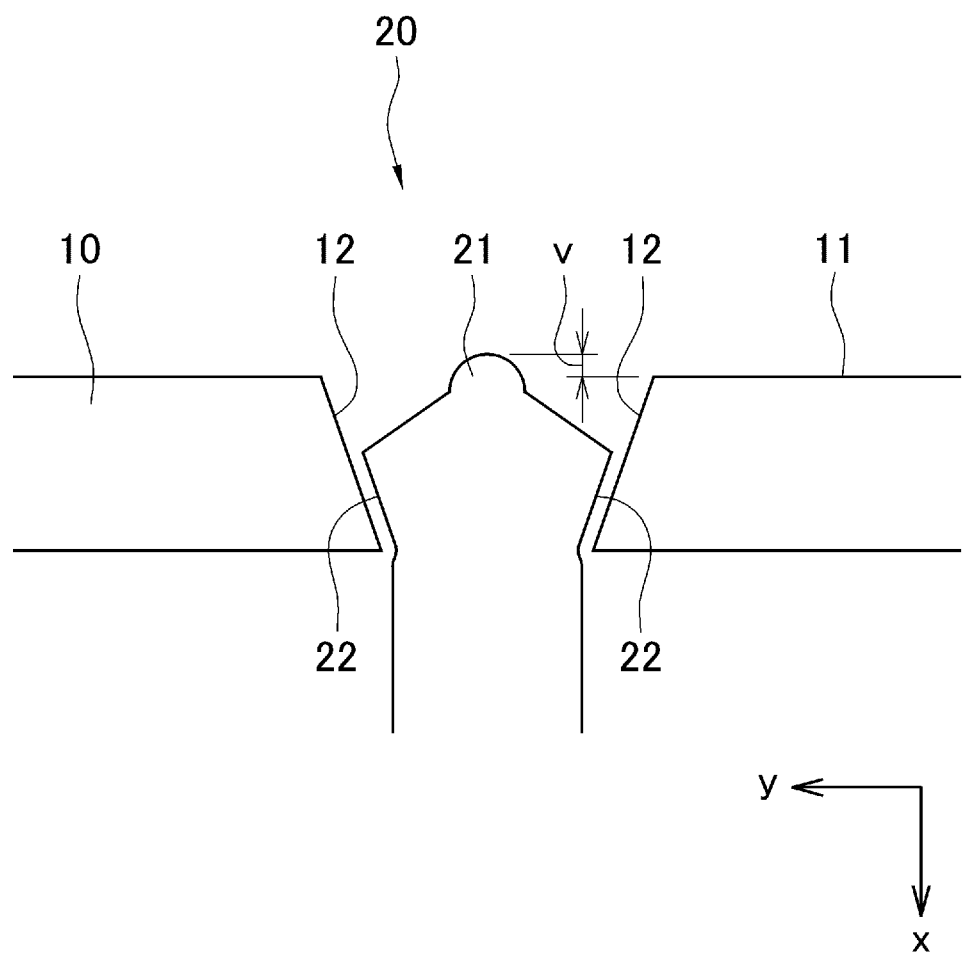

FIG. 5
1 CLEAN SUBSTRATE
2 BY PHOTOLITHOGRAPHY ON TOP
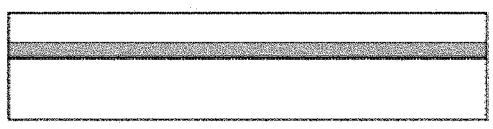
3 FORM CIRCUIT
  BY PHOSPHORUS DIFFUSION
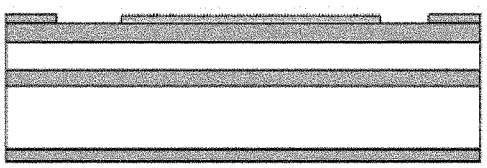
4 BY PHOTOLITHOGRAPHY
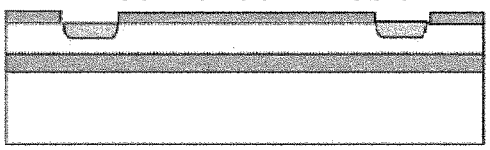
5 REMOVE OXIDE FILM
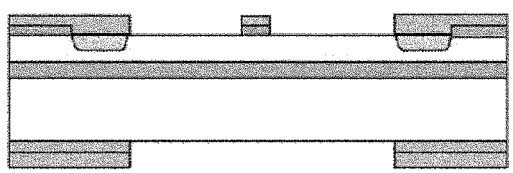
6 BY SILICON ETCHING
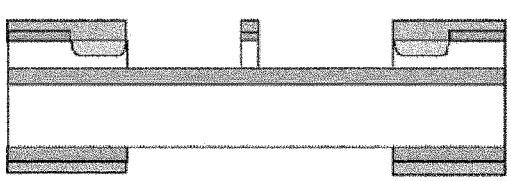
7 ICP-RIE AFTER FILLING RESIST
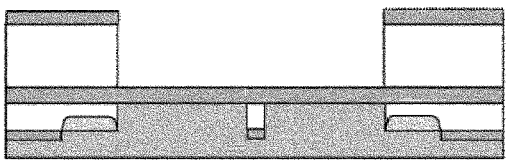
8 REMOVE OXIDE FILM AND RESIST
CONTACT FIG. 6
(A) 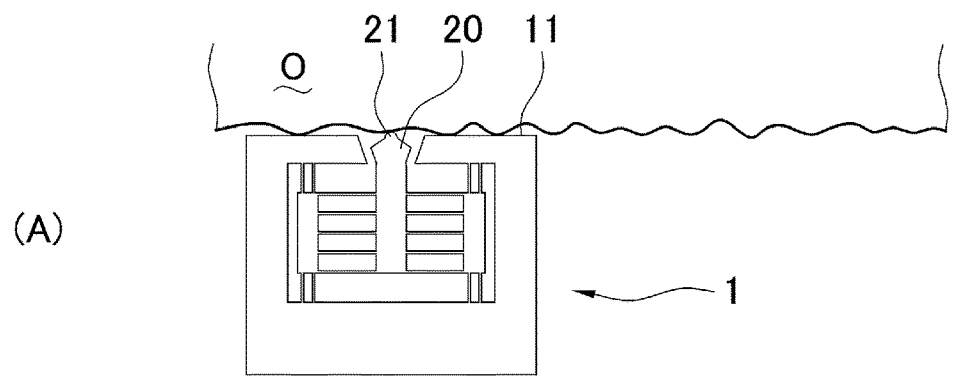
(B) 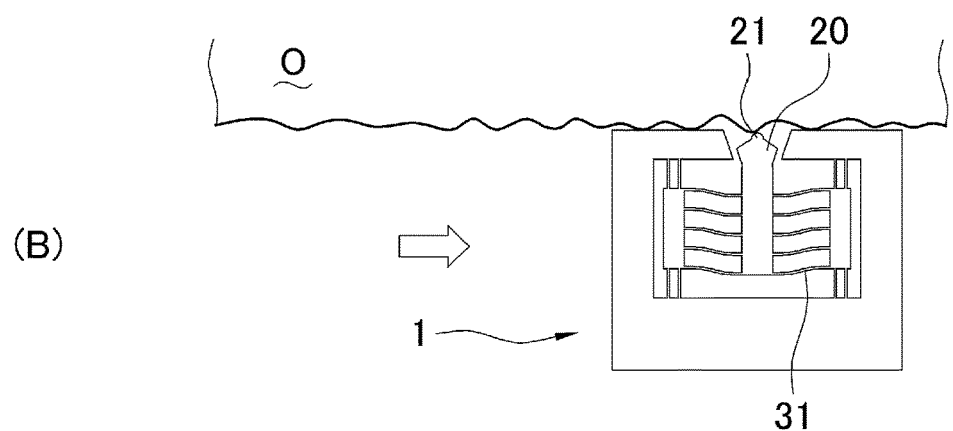
(C) 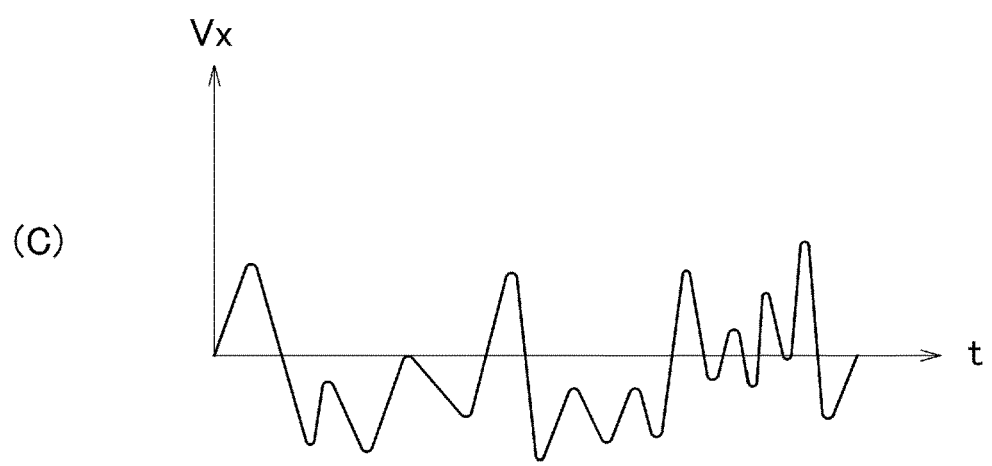

3
TACTILE SENSOR

FIG. 10
(A) 
(B) 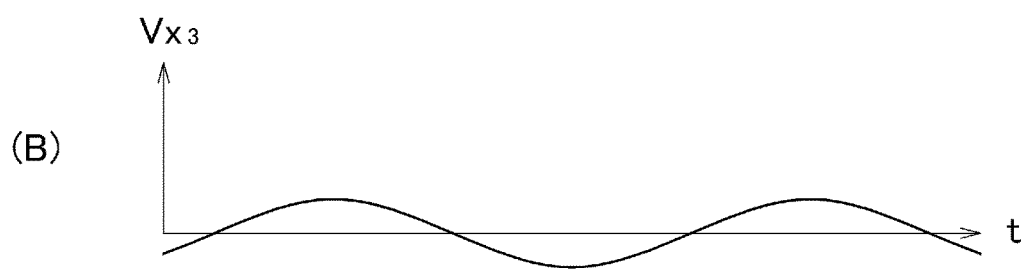
(C) 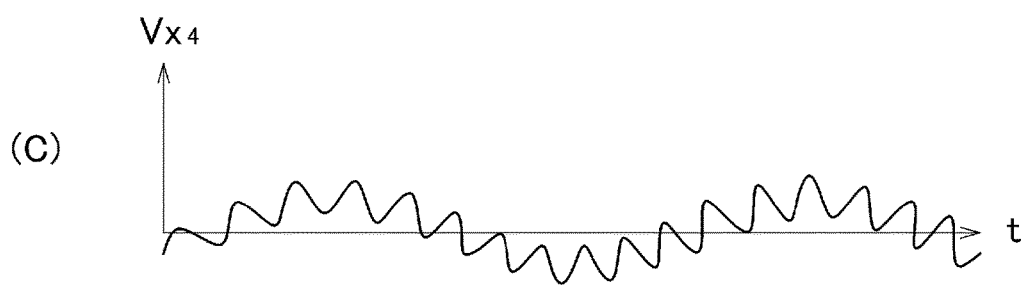
(D) 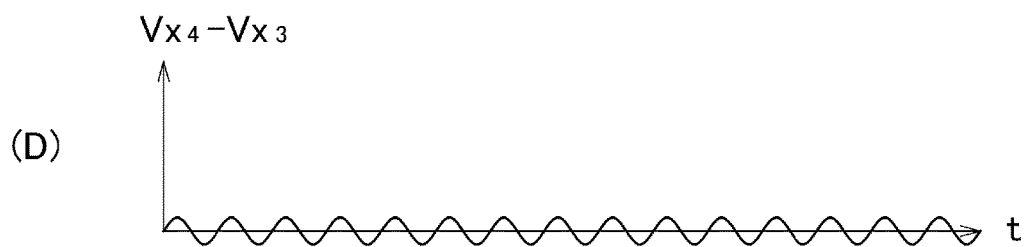

F I G. 1 4
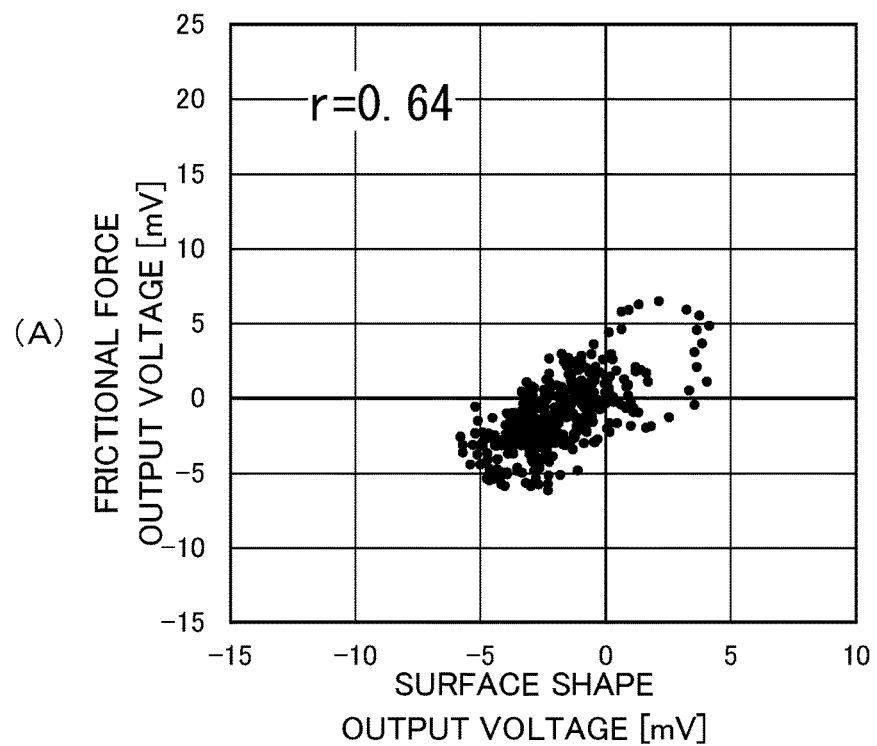
(A)
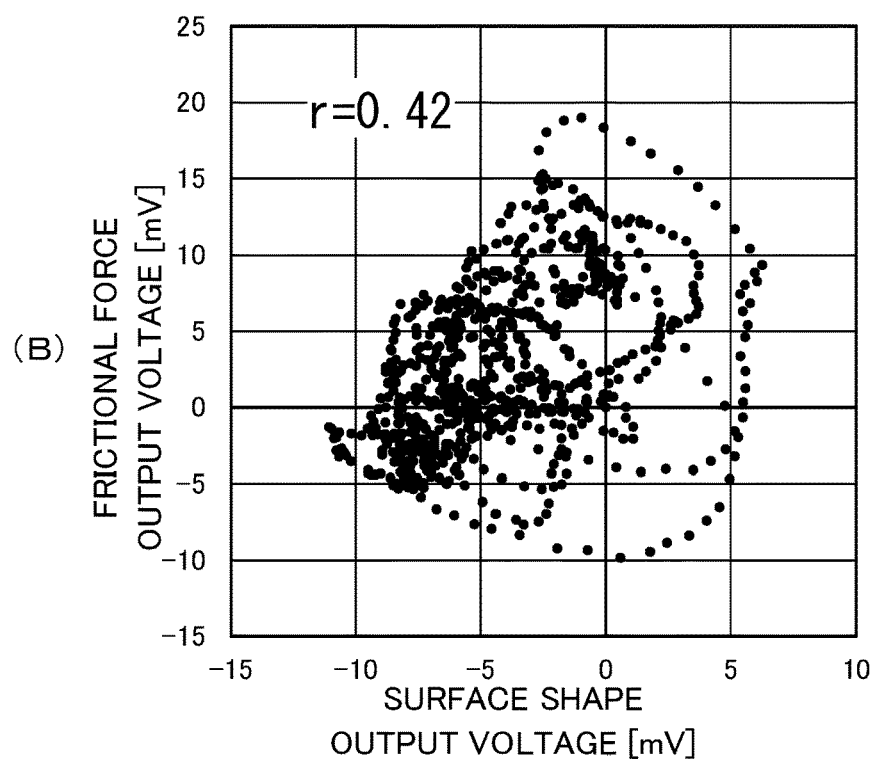
(B)

F I G. 1 5
(A)
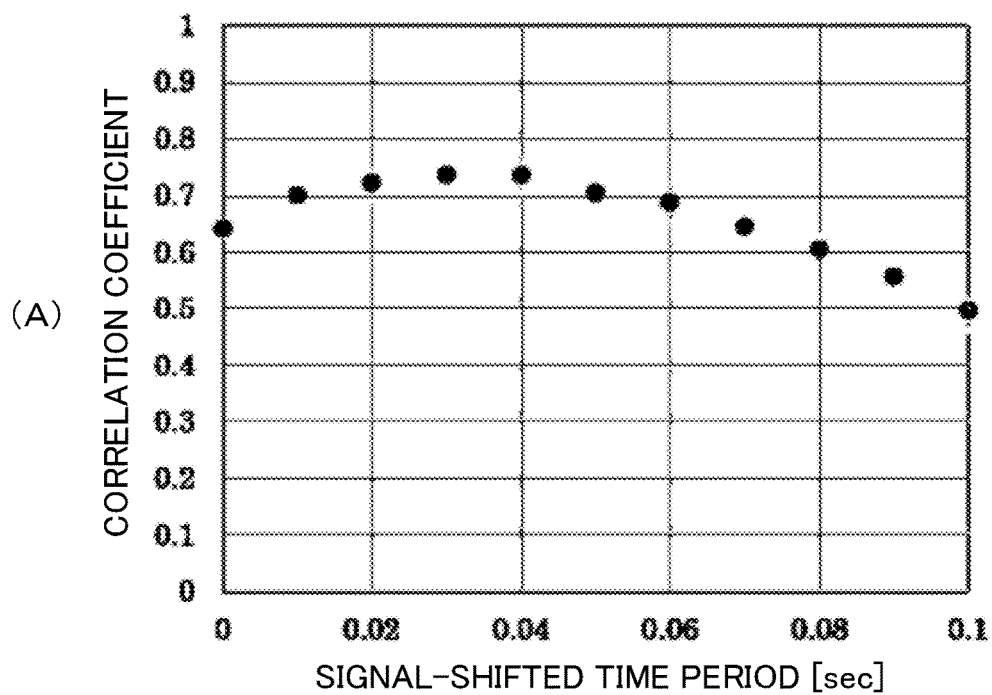
(B)
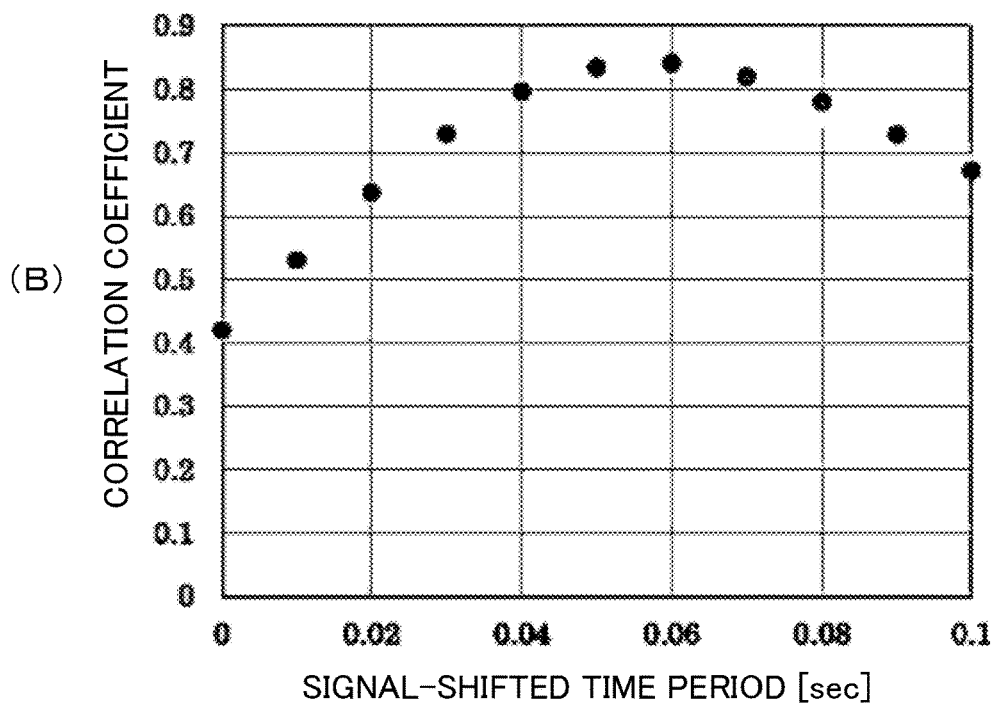

FIG. 16
(A)
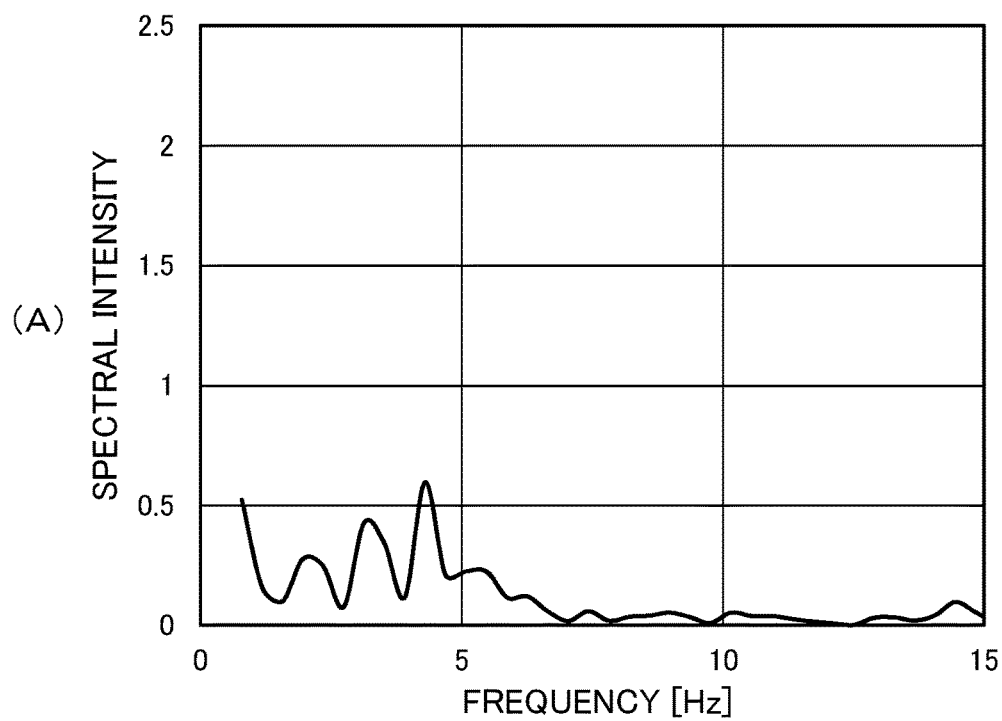
(B)
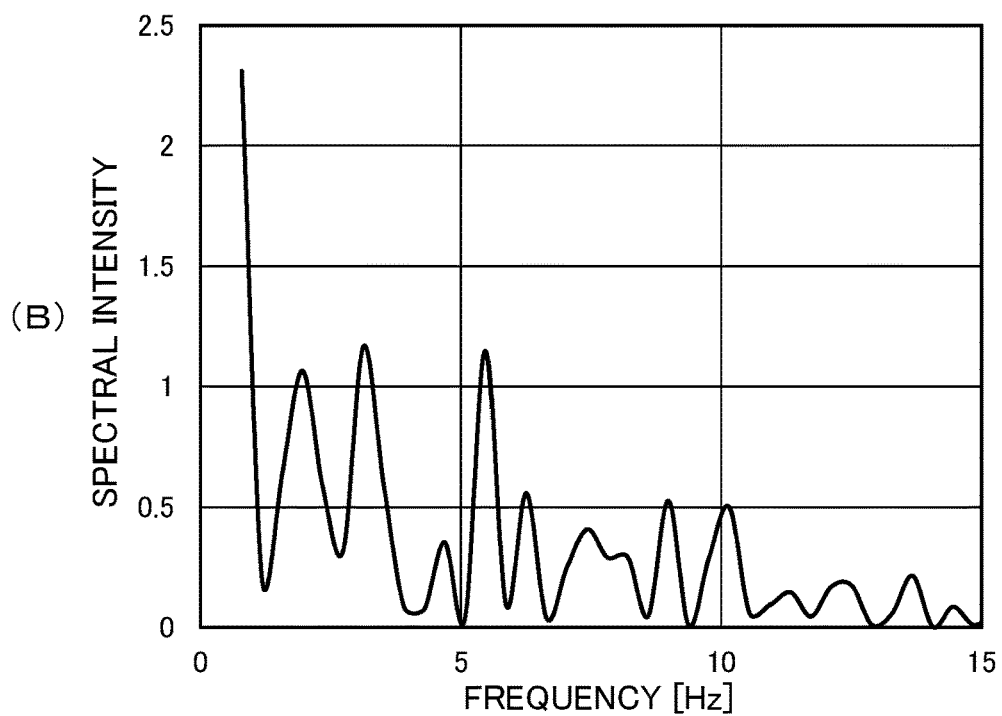

TACTILE SENSOR AND METHOD FOR EVALUATING TOUCH FEELING

TECHNICAL FIELD

The invention relates to a tactile sensor and a method for evaluating a touch feeling, and especially to a tactile sensor for use to quantify a touch feeling felt by a human and a method for evaluating a touch feeling based on the data acquired by the tactile sensor.

BACKGROUND ART

Various tactile sensors that simulate a human feeling in an engineering manner have been developed. Especially, a tactile sensor that is made by semiconductor micromachining techniques and can read a lot of sensor signals with less wiring allows a lot of sensor parts to be arranged in high density, and advantageously has high positional resolution.

As the tactile sensors made by semiconductor micromachining techniques, for example, a tactile sensor that utilizes deformation of a thin silicon diaphragm (Patent Literature 1) and a tactile sensor that utilizes deformation of hinge structure (Patent Literature 2) are known. Each of these conventional tactile sensors disclosed in Patent Literature 1 and Patent Literature 2 uses the surface of a substrate as a sensing surface, and is configured to make the surface of the substrate come in contact with a measuring object to read the deformation by the force applied in a vertical direction to the substrate. Therefore, such sensing structure is configured in a thickness direction of the substrate.

However, such a tactile sensor with the surface of the substrate used as a sensing surface allows little displacement due to the limitation of material properties and/or thickness of the substrate. Further, the flexibility in designing a tip shape of a contact of a tactile sensor is limited because the contact is vertically arranged to the substrate, and thus the tip shape appropriate to various measuring objects cannot be designed. Therefore, the problem is that such a tactile sensor is poor in detection performance with regard to fine ruggedness on the surface of a measuring object, and thus has difficulty in evaluating a fine touch feeling.

Moreover, stable detection of tactile sense and/or feeling requires that a tactile sensor performs sensing while keeping applying force (contact surface pressure) constant to a measuring object. However, it is difficult for conventional tactile sensors to keep such a measuring condition.

CITATION LIST

Patent Literature

Patent Literature 1: Japanese Patent publication No. 2004-163166
Patent Literature 2: Japanese Patent publication No. 2006-208248

SUMMARY OF INVENTION

Technical Problem

Taking into consideration the problem described above, the object of the invention is to provide a tactile sensor that allows a contact to be displaced largely and can detect fine ruggedness, flexibility, and other features of a surface of a measuring object.

Another object is to provide a tactile sensor that can perform sensing while keeping applying force (contact surface pressure) substantially constant to a measuring object and that can perform stable measurement.

Yet another object is to provide a method for evaluating a touch feeling based on the data acquired by a tactile sensor.

Solution to Problem

In a tactile sensor of the first invention, the tactile sensor includes a sensor part formed in a substrate. The sensor part includes a frame that includes a side part of the substrate, a contact that is disposed in parallel to the substrate so that a tip of the contact projects from a side face of the substrate, a suspension that supports the contact to the frame, and a displacement detector that detects displacement of the contact.

In a tactile sensor of the second invention, according to the first invention, the suspension includes a first suspension that allows the contact to be displaced vertically to the side face of the substrate, and a second suspension that allows the contact to be displaced horizontally to the side face of the substrate. The displacement detector includes a first strain detection element that detects strain of the first suspension, and a second strain detection element that detects strain of the second suspension.

In a tactile sensor of the third invention, according to the first or the second invention, the tip of the contact is formed in a circular arc.

In a tactile sensor of the fourth invention, according to the first, the second or the third invention, a contacting part that faces the contact apart by a predetermined gap width is formed on the frame.

In a tactile sensor of the fifth invention, according to the first, the second or the third invention, a pair of contacting faces is formed on the frame so as to sandwich the contact, a pair of contacted faces that respectively faces the pair of contacting faces is formed on the contact, the pair of contacting faces is inclined to the side face of the substrate so as to spread toward the side face, and the pair of contacted faces is disposed in parallel to the pair of contacting faces apart by a predetermined gap width.

In a tactile sensor of the sixth invention, according to the first, the second, the third, the fourth, or the fifth invention, a plurality of the sensor parts are included.

In a tactile sensor of the seventh invention, according to the sixth invention, the tips of the contacts of the plurality of sensor parts are formed respectively in circular arcs having different radii.

In a tactile sensor of the eighth invention, according to the sixth invention, the plurality of sensor parts are disposed so that the contacts respectively project from the side face of the substrate by different projection distance.

In a method for evaluating a touch feeling of the ninth invention, the method is to evaluate a touch feeling of a measuring object based on data rows including surface shapes and frictional forces of the measuring object. The method includes calculating a correlation coefficient between the surface shapes and the frictional forces, and evaluating the touch feeling by use of the correlation coefficient as an index.

In a method for evaluating a touch feeling of the tenth invention, the method is to evaluate a touch feeling of a measuring object based on data rows including surface shapes and frictional forces of the measuring object. The method includes calculating correlation coefficients between the surface shapes and the frictional forces in various phase differences, and evaluating the touch feeling by use of one of the various phase differences at a peak of the correlation coefficient as an index.

In a method for evaluating a touch feeling of the eleventh invention, the method is to evaluate a touch feeling of a measuring object based on data rows including surface shapes and frictional forces of the measuring object. The method includes obtaining differential spatial frequency distribution with regard to the surface shapes and the frictional forces, and evaluating the touch feeling by use of the differential spatial frequency distribution as an index.

Advantageous Effects of Invention

According to the first invention, since the contact is disposed in parallel to the substrate so that the tip of the contact projects from a side face of the substrate, the side face of the substrate functions as a sensing surface, and the contact coming in contact with the measuring object is displaced in a level parallel to the substrate. The sensor part can be configured widely in a planar manner along the substrate, and thus, design change can be performed easily through pattern designing and the structure has high flexibility of design. As a result, the structure allows the contact to be displaced largely and allows detection of fine ruggedness, flexibility and other features of the surface of the measuring object. Further, the contact is disposed so that the tip of the contact projects from the side face of the substrate, and thus, force applied to the measuring object can be kept substantially constant during sensing, and the stable and sustainable contact between the contact and the measuring object allows stable measurement.

According to the second invention, the first strain detection element can detect strain of the contact in the pressing direction, and the second strain detection element can detect strain of the contact in the side slippage direction. Based on the displacement in the pressing direction and/or the displacement in the side slippage direction of the contact, the measuring object can be measured in surface shape, surface roughness, frictional force, flexibility and other features.

According to the third invention, when the tactile sensor is slid while being pressed to the measuring object, the contact is displaced following ruggedness of a comparable wavelength band to a radius of the tip of the contact. Thus, the surface shape of the measuring object can be measured by selecting a wavelength band with a radius of the tip of the contact.

According to the fourth invention, since the contacting face is arranged on the frame, the frame can limit the displacement of the contact to a predetermined amount or less, which prevents the sensor part from being braked due to excessive displacement of the contact.

According to the fifth invention, since the pair of contacting faces is inclined so as to spread toward the side face of the substrate, the gap between the contacting faces and the contacted faces becomes narrower when the contact is pressed in. In accordance with the width of the narrowed gap, the displacement of the contact in the side slippage direction can be further limited, which prevents the sensor part from being braked due to excessive displacement of the contact.

According to the sixth invention, when the tactile sensor is slid while being pressed to the measuring object, the moved distance and velocity of the tactile sensor can be measured based on the cycle of ruggedness of the measuring object measured by the sensor parts.

According to the seventh invention, since the tips of the contacts of the plurality of sensor parts are formed respectively in circular arcs having different radii, each of the contacts is displaced following ruggedness of a comparable wavelength band to the radius of the tip of the contact. Therefore, the surface shape of the measuring object can be measured through being decomposed into respective wavelength bands by the sensor parts. The surface roughness of the measuring object can be detected by use of the surface shape decomposed into respective wavelength bands as an index. In addition, the flexibility of the measuring object can be measured based on the difference between the displacement in the pressing direction of the contact having the tip with a small radius and the displacement in the pressing direction of the contact having the tip with a large radius when the tactile sensor is pressed to the measuring object.

According to the eighth invention, the flexibility of the measuring object can be measured through comparison between the displacement in the pressing direction of the contact projecting by a large projection distance and the displacement in the pressing direction of the contact projecting by a small projection distance when the tactile sensor is pressed to the measuring object. In addition, since the contacts projecting by different projection distance can apply force differently to the measuring object when the tactile sensor is slid while being pressed to the measuring object, the different touch feelings when the measuring object is slid strongly and lightly can be measured simultaneously.

According to each of the ninth, tenth, and eleventh inventions, the touch feeling can be evaluated based on the data acquired by the tactile sensor.

BRIEF DESCRIPTION OF DRAWINGS

FIG. 2 shows an explanatory drawing of a strain detection element of the tactile sensor. FIG. 2A shows a case of suspensions with no strain, and FIG. 2B shows a case of the suspensions distorted.

FIG. 4 shows an enlarged view of a tip of a contact of the tactile sensor.

FIG. 5 shows an explanatory drawing of a manufacturing process of the tactile sensor.

FIG. 6 shows an explanatory drawing of a method for detecting a surface shape.

FIG. 6A shows a front view illustrating the state in which the tactile sensor is pressed to a measuring object, FIG. 6B shows a front view illustrating the state in which the tactile sensor is slid along the surface of the measuring object, and FIG. 6C shows an example spatial waveform reproduced by the method for detecting a surface shape.

FIG. 10 shows an explanatory drawing of a method for detecting surface roughness. FIG. 10A shows a surface shape of a measuring object, FIG. 10B shows the spatial waveform measured by a sensor part S3, FIG. 10C shows the spatial waveform measured by a sensor part S4, and FIG. 10D shows the spatial waveform obtained by eliminating the spatial waveform measured by the sensor part S3 from the spatial waveform measured by the sensor part S4.

FIG. 13A shows a case of copy paper, and FIG. 13B shows a case of straw paper.

FIG. 14 shows a scatter diagram showing correlation between surface shape and frictional force. FIG. 14A shows a case of copy paper, and FIG. 14B shows a case of straw paper.

FIG. 15 graphically shows correlation coefficients between surface shape and frictional force in various conditions of phase difference. FIG. 15A shows a case of copy paper, and FIG. 15B shows a case of straw paper.

FIG. 16 graphically shows differential spatial frequency distribution with regard to surface shape and frictional force. FIG. 16A shows a case of copy paper, and FIG. 16B shows a case of straw paper.

DESCRIPTION OF EMBODIMENTS

Some embodiments of the invention are described based on drawings.

First Embodiment

Configuration

Figure 1:
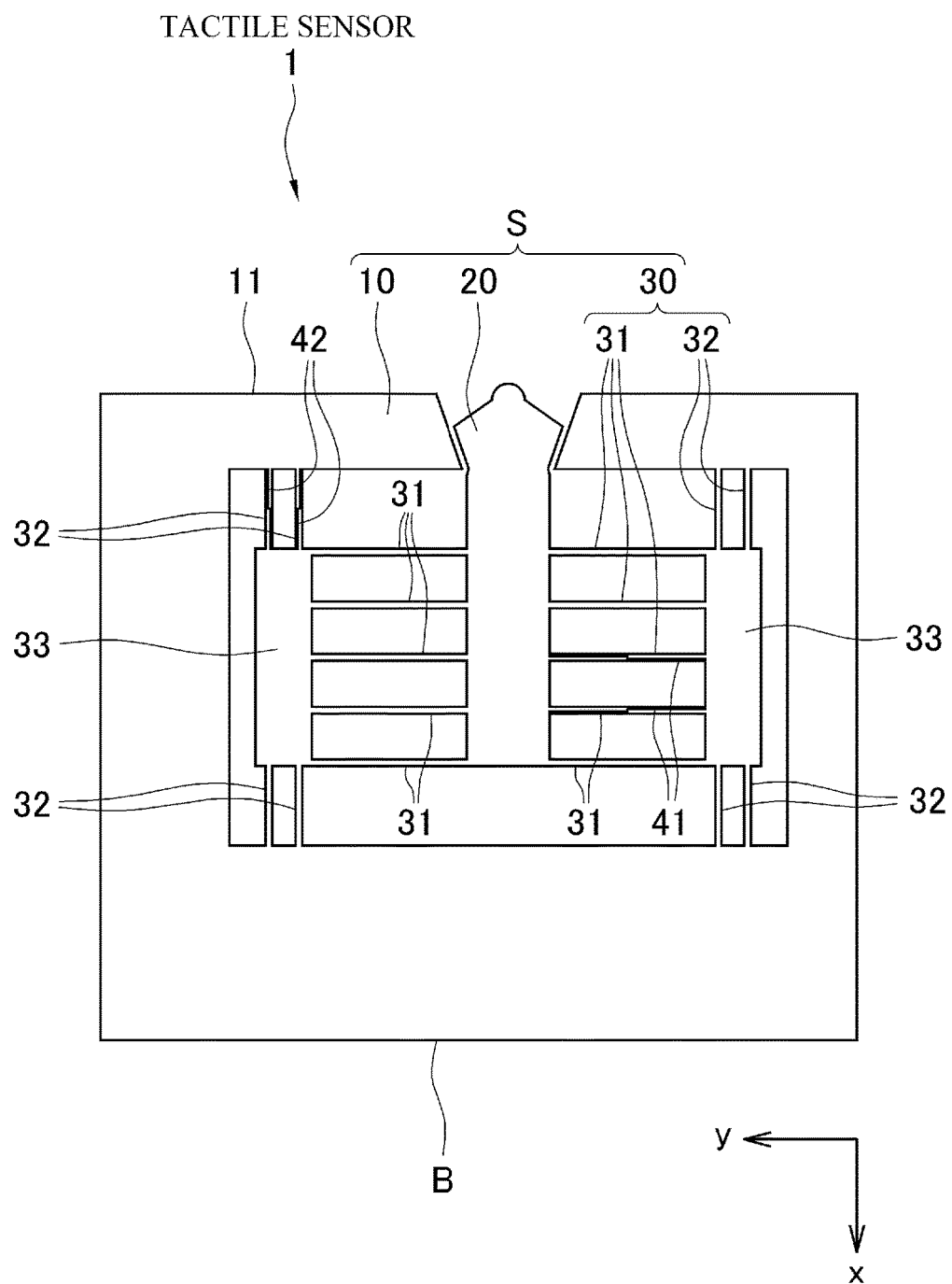
FIG. 1 shows a plan view of a tactile sensor of the first embodiment of the invention.

As shown in FIG. 1, a tactile sensor 1 of the first embodiment of the invention includes a sensor part S formed through working a substrate B such as a SOI substrate by semiconductor micromachining techniques. The sensor part S has a frame 10, a contact 20, and a suspension 30 that supports the contact 20 to the frame 10. The size of the sensor part S is not limited to, but several millimeters square to more than ten millimeters square.

As described below, the contact 20 and the suspension 30 are formed by etching the substrate B in a predetermined pattern so as to remove unnecessary parts thereof. The frame 10 is the remained part of the substrate B after the unnecessary parts are removed, and has a shape enclosing the contact 20 and the suspension 30. The sensor part S has a sensing surface (surface coming in contact with a measuring object) which is one side face of the substrate B. In the embodiment, the upper face out of the side faces of the substrate B in FIG. 1 is used as a sensing surface. The frame 10 may include the side part (upper part in FIG. 1) of the substrate B having the sensing surface, but the shape thereof is not particularly limited. The face having the sensing surface out of the side faces of the frame 10 is referred to as a reference surface 11.

The contact 20, a bar-shaped member, is disposed in parallel to the substrate B, that is, on the same flat surface as the substrate B. The frame 10 has an opening partially on the side part having the sensing surface, and the tip of the contact 20 is inserted into the opening. The contact 20 is disposed so that the tip thereof projects outside from the reference surface 11 (the side of the substrate B). The contact 20 is also disposed so that the central axis thereof is vertical to the reference surface 11.

The suspension 30 includes a plurality of first suspensions 31 and a plurality of second suspensions 32. In the space surrounded by the frame 10, two islands 33 are formed so as to sandwich the contact 20. Each of the plurality of first suspensions 31, a beam-shaped member, is disposed between the contact 20 and one of the islands 33. Each of the plurality of second suspensions 32, a beam-shaped member, is disposed between one of the islands 33 and the frame 10. The contact 20 is supported to the frame 10 by the plurality of first suspensions 31, the plurality of second suspensions 32 and the islands 33.

The plurality of first suspensions 31 are disposed vertically to the central axis of the contact 20, that is, horizontally to the sensing surface (reference surface 11). Therefore, the plurality of first suspensions 31 allow the contact 20 to be displaced vertically to the sensing surface (reference surface 11) (displacement in x direction in FIG. 1) (hereinafter, referred to as "displacement in a pressing direction"). In the embodiment, ten first suspensions 31 in total are disposed so that a set of five first suspensions 31 is disposed in the both sides of the contact 20, but the number of the first suspensions 31 is not particularly limited. The number and/or the width thereof may be set so as to obtain elasticity required as the first suspensions 31.

The plurality of second suspensions 32 are disposed in parallel to the central axis of the contact 20, that is, vertically to the sensing surface (reference surface 11). Therefore, the plurality of second suspensions 32 allow the contact 20 to be displaced horizontally to the sensing surface (reference surface 11) (displacement in y direction in FIG. 1) (hereinafter, referred to as "displacement in a side slippage direction"). In the embodiment, eight second suspensions 32 in total are disposed so that a set of two second suspensions 32 is disposed in the both sides of each of the islands 33, but the number of the second suspensions 32 is not particularly limited. The number and/or the width thereof may be set so as to obtain elasticity required as the second suspensions 32.

When the sensing surface of the tactile sensor 1 is pressed to a measuring object, the contact 20 is displaced in the pressing direction (x direction). Further, when the sensing surface of the tactile sensor 1 is slid while being pressed to a measuring object, the contact 20 is displaced in the pressing direction (x direction), and in addition displaced in the side slippage direction (y direction). The sensor part S includes a displacement detector 41 and 42 in order to detect such displacement of the contact 20.

Each of the displacement detectors 41 and 42 includes a first strain detection element 41 that detects strain of the first suspension 31, or a second strain detection element 42 that detects strain of the second suspension 32. In the embodiment, each of the first strain detection element 41 and the second strain detection element 42, a piezoresistor, is formed on the first suspension 31 or the second suspension 32 in an integrated circuit manufacturing process such as impurity diffusion and/or ion implantation, by techniques for forming metal wiring or the like.

As shown in FIG. 2A, each of the first strain detection elements 41a and 41b is formed on the surface of each of two first suspensions 31 out of the plurality of first suspensions 31. Each of the first strain detection elements 41a and 41b is formed in a shape of a step along one side face of one of the first suspensions 31 from the end to the center thereof and along the other side face of the first suspension 31 from the center to the other end thereof. In addition, the first strain detection element 41a formed on one of the first suspensions 31 is line-symmetric relative to the first strain detection element 41b formed on the other of the first suspensions 31.

As shown in FIG. 2B, when the first suspensions 31 are distorted, one side of the first strain detection element 41a has smaller resistance due to compression stress, and the other side of the first strain detection element 41a has larger resistance due to tensile stress.

Figure 3:
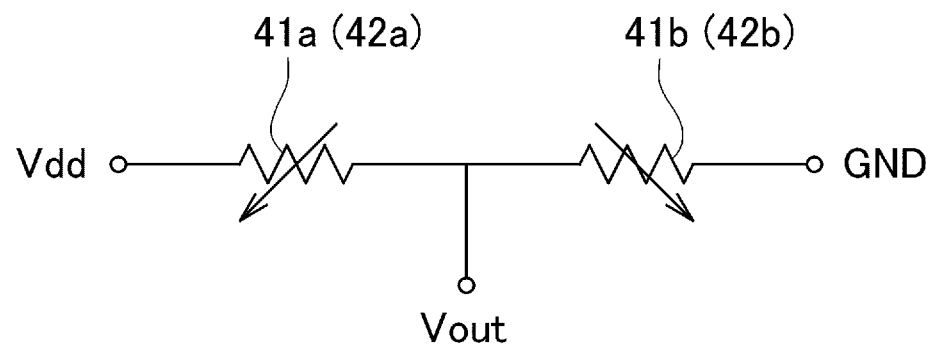
FIG. 3 shows a circuit diagram of a strain detection circuit.

A circuit (not shown in FIG. 1 or in FIG. 2) as shown in FIG. 3 is formed on the surface of the substrate B. In the circuit, the first strain detection elements 41a and 41b are connected in series and a voltage Vdd is applied to both ends of the series connection, and then a voltage Vout between the first strain detection elements 41a and 41b is measured. Strain of the first suspensions 31 can be detected by measuring a voltage Vout that varies in accordance with differential between the first strain detection elements 41a and 41b. Based on the strain, displacement of the contact 20 in the pressing direction (x direction) can be detected.

Similarly, each of the second strain detection elements 42a and 42b is formed on the surface of each of two second suspensions 32 out of the plurality of second suspensions 32. Each of the second strain detection elements 42a and 42b is formed in a shape of a step. When the plurality of second suspensions 32 are distorted, one side of the second strain detection element 42a has smaller resistance due to compression stress, and the other side of the second strain detection element 42a has larger resistance due to tensile stress. A circuit (not shown in FIG. 1 or in FIG. 2) is formed on the surface of the substrate B. In the circuit, the second strain detection elements 42a and 42b are connected in series and a voltage Vdd is applied to both ends of the series connection, and then a voltage Vout between the second strain detection elements 42a and 42b is measured. Strain of the plurality of second suspensions 32 can be detected by measuring a voltage Vout. Based on the detected strain, displacement of the contact 20 in the side slippage direction (y direction) can be detected.

FIG. 4 shows an enlarged view of the tip of the contact 20. As shown in FIG. 4, a contact part 21 having a semicircular shape is formed on the tip of the contact 20. The tip of the contact 20 may be formed in a circular arc shape, not limited to the semicircular shape, that is, may be in a fan shape with a central angle of larger or smaller than 180 degrees.

The contact 20 is disposed in parallel to the substrate B and then etching is performed in a predetermined pattern so as to form the contact 20. This can form the contact part 21 in a characteristic shape on the tip of the contact 20. In a case of a contact part disposed vertically to the substrate, the tip of the contact part needs to be formed flat or in a square-pyramid shape by anisotropic etching, not in an arbitrarily-designed shape such as a smooth curved surface.

In a state where the contact 20 is not pressed in, the top of the contact part 21 projects by a predetermined projection distance v from the reference surface 11. When the sensing surface is made come in contact with a measuring object, the contact 20 is displaced in the pressing direction (x direction) by the maximum amount v or less. That is, the tip of the contact 20 is not pressed inside lower than the reference surface 11. As above, the frame 10 can limit the displacement of the contact 20 in the pressing direction (x direction) to a predetermined maximum amount or less, which can prevent the sensor part S from being braked due to excessive displacement of the contact 20.

The contact 20 is disposed so that the tip thereof slightly projects from the reference surface 11. Thus, force applied by the contact 20 to a measuring object (contact surface pressure) can be kept substantially constant during sensing, and the stable and sustainable contact between the contact 20 and the measuring object allows stable measurement.

Each of the frame 10 and the contact 20 has the following configuration so as to limit the displacement in the side slippage direction (y direction) of the contact 20 to a predetermined amount or less. A pair of contacting faces 12 and 12 is formed on an edge face of an opening of the frame 10. The formed pair of contacting faces 12 and 12 sandwiches the contact 20. A pair of contacted faces 22 and 22 facing the contacting faces 12 and 12 is formed.

The pair of contacting faces 12 and 12 is disposed substantially in a V shape. That is, the pair is inclined to the sensing surface so as to spread toward the sensing surface. Similarly, the pair of contacted faces 22 and 22 is disposed substantially in a V shape. That is, the pair is inclined to the sensing surface so as to spread toward the sensing surface. The pair of contacted faces 22 and 22 is disposed in parallel to the pair of contacting faces 12 and 12 apart by a predetermined gap width. The contacting faces 12 and the contacted faces 22 are formed by linearly etching and removing the parts between the frame 10 and the contact 20 so as to make a predetermined gap width.

In a state where the contact 20 is not pressed in, there is a gap between the contacting face 12 and the contacted face 22, for example, with the minimum machinable width by etching. When the contact 20 comes in contact with a measuring object and is pressed in, the gap between the contacting face 12 and the contacted face 22 becomes narrower. In accordance with the width of the narrowed gap, the displacement of the contact 20 in the side slippage direction (y direction) is further limited. That is, this makes the width of the gap narrower than the machinable width, and thus the displacement of the contact 20 in the side slippage direction (y direction) can be limited to the narrowed width. As a result, this structure can prevent the sensor part S from being braked due to excessive displacement of the contact 20.

In accordance with the object of measurement, the maximum value of each of the displacement of the contact 20 in the pressing direction (x direction) and the displacement in the side slippage direction (y direction) may be set, and further, the projection distance v of the contact 20 from the reference surface 11 and the width of the gap between the contacting face 12 and the contacted face 22 may be set. The shapes of the plurality of first suspensions 31 and the plurality of second suspensions 32 may be designed so as to allow the maximum displacement of the contact 20.

As described above, the contact 20 is disposed in parallel to the substrate B so that the tip thereof projects from the side face of the substrate B. Thus, the side face of the substrate B functions as a sensing surface and the contact 20 coming in contact with a measuring object is displaced in a level parallel to the substrate B. Therefore, since the sensor part S can be configured widely in a planar manner along the substrate B as described above, design change can be performed more easily through pattern designing and the structure has higher flexibility of design, compared to the conventional case in which such structure is formed in the thickness direction of the substrate B. As a result, the structure allows the contact 20 to be displaced largely and can detect fine ruggedness, flexibility and other features of the surface of the measuring object. Further, the structure can prevent the sensor part S from being damaged during measurement because the measuring object does not come in direct contact with an electric circuit part thereof.

Manufacturing Method

Next, the method for manufacturing the tactile sensor 1 with SOI substrate is described based on FIG. 5.

The SOI substrate has three-layer structure of a base substrate (silicon), an oxide film layer (silicon dioxide) and an active layer (silicon) with a thickness of, for example, 300 µm.

First, the substrate is cleaned and subjected to oxidation treatment. Next, a diffusion layer pattern to be a circuit part is formed and phosphorus diffusion is performed. Then, the back surface of the substrate is subjected to sputtering to form a chrome thin-film, and the chrome film is subject to etching to form a pattern of the movable structure part (contact 20 and suspension 30) for release. Then, the oxide film of the upper surface is removed and the movable structure part is formed by ICP-RIE etching. Finally, the intermediate oxide film and a resist are removed to release the movable structure part.

Detection Method

Next, a detection method by use of the tactile sensor 1 is described.

When performing detection by use of the tactile sensor 1, the sensing surface is pressed to a measuring object, or the sensing surface is slid while being pressed to a measuring object. This displaces the contact 20, and at the same time distorts the plurality of first suspensions 31 and the plurality of second suspensions 32. Due to the strain, the first strain detection element 41 detects displacement in the pressing direction (x direction) of the contact 20, and the second strain detection element 42 detects displacement in the side slippage direction (y direction) of the contact 20. Based on the displacement in the pressing direction (x direction) and/or the displacement in the side slippage direction (y direction) of the contact 20, the measuring object can be measured in surface shape, surface roughness, frictional force, flexibility and other features thereof. The detection method is detailed in order below.

Method for Detecting Surface Shape

First, the method for detecting a surface shape of a measuring object by use of the tactile sensor 1 is described.

As shown in FIG. 6A, the sensing surface of the tactile sensor 1 is pressed to a surface of a measuring object O so as to make the reference surface 11 come in contact with the measuring object O. This locates the reference surface 11 to the level connecting peaks of the ruggedness on the surface of the measuring object O. When the contact part 21 comes in contact with the surface of the measuring object O, the contact 20 is pressed by the reaction force of the measuring object O.

Next, as shown in FIG. 6B, the sensing surface of the tactile sensor 1 is slid along the surface of the measuring object O while being pressed to the surface of the measuring object O. This displaces the contact 20 in the pressing direction following the ruggedness on the surface of the measuring object O, and thus distorts the first suspensions 31. The first strain detection element 41 detects temporal change or distance change of the displacement of the contact 20 in the pressing direction.

As shown in FIG. 6C, the surface shape (spatial waveform) of the surface of the measuring object O can be reproduced based on the detected temporal change or distance change of the displacement of the contact 20 in the pressing direction.

Here, the contact 20 is displaced following ruggedness of a comparable wavelength band to a radius of the contact part 21. That is, the contact part 21 with a smaller radius can follow ruggedness having smaller wavelengths, and detect finer ruggedness on the surface of a measuring object. On the other hand, the contact part 21 with a larger radius more hardly follows fine ruggedness, and thus can detect the ruggedness having larger wavelengths (swell) regardless of fine ruggedness on the surface of the measuring object. As described above, the surface shape of the measuring object O can be measured by selecting a wavelength band (frequency band) with a radius of the contact part 21.

The tip (contact part 21) in a circular arc of the contact 20 comes in contact with the measuring object O. Thus, the contact 20 can move smoothly without being caught by the measuring object O during when the tactile sensor 1 is slid while being pressed to the measuring object O. Therefore, the contact 20 is displaced following the ruggedness on the surface of the measuring object, and thus accurate measurement with regard to the surface shape of the measuring object O can be performed.

Method for Detecting Frictional Force

Next, the method for detecting frictional force of the measuring object by use of the tactile sensor 1 is described.

Figure 7:
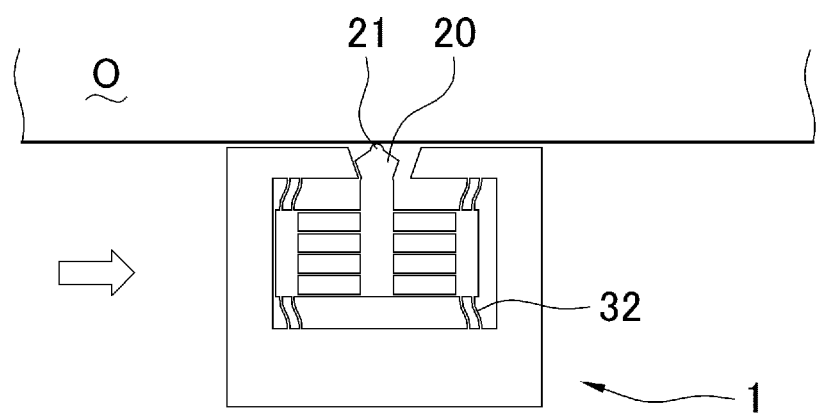
FIG. 7 shows an explanatory drawing of a method for detecting frictional force, showing a front view of the state in which the tactile sensor is slid along the surface of a measuring object.

As shown in FIG. 7, the sensing surface of the tactile sensor 1 is slid along the surface of the measuring object O while being pressed to the surface of the measuring object O. The reaction force received from the measuring object O displaces the contact 20 in the pressing direction, and the displacement distorts the first suspensions 31. The first strain detection element 41 detects the displacement of the contact 20 in the pressing direction. The frictional force generated between the contact part 21 and the measuring object O also slides the contact 20, and the sliding distorts the second suspensions 32. The second strain detection element 42 detects the displacement of the contact 20 in the side slippage direction.

Since an elastic modulus of the first suspensions 31 is known, a reaction force Fx received by the contact 20 can be calculated based on the displacement of the contact 20 in the pressing direction. Similarly, since an elastic modulus of the second suspensions 32 is known, a frictional force Fy received by the contact 20 can be calculated based on the displacement of the contact 20 in the side slippage direction. By use of the calculated reaction force Fx and the calculated frictional force Fy, a dynamic friction coefficient µ of the surface of the measuring object O can be calculated based on Formula 1 below.

$$\mu = F_x/F_y \quad \text{Formula 1}$$

An operation similar to the one described above may allow detection of the force applied in the direction parallel to the surface of the measuring object O, such as an unsmooth feeling in a case of a fibrous measuring object O.

Second Embodiment

Figure 8:
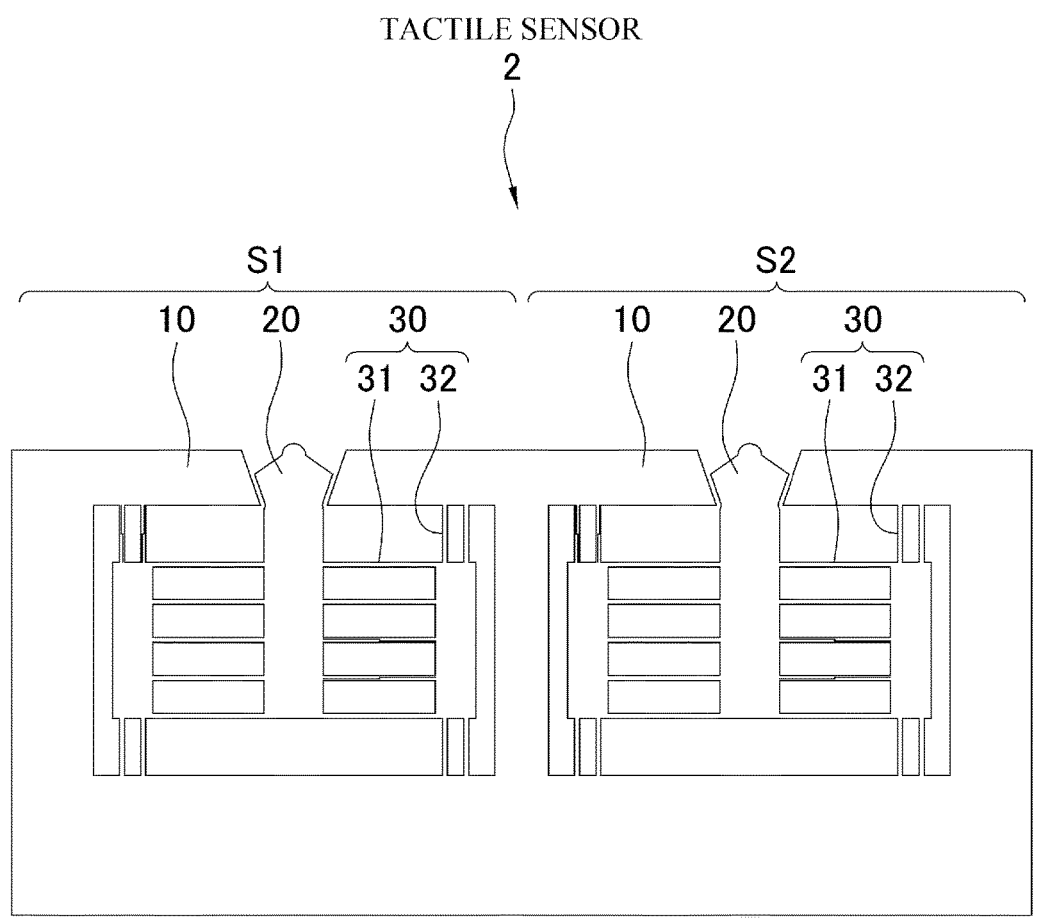
FIG. 8 shows a plan view of a tactile sensor of the second embodiment of the invention.

As shown in FIG. 8, a tactile sensor 2 of the second embodiment of the invention includes two sensor parts of a sensor part S1 and a sensor part S2. Each of the sensor parts S1 and S2 has the same configuration as the sensor part S of the tactile sensor 1 of the first embodiment, and thus the same codes are attached to the same members and the description thereof is omitted herein.

The sensor parts S1 and S2 are disposed so as to share a sensing surface. That is, the contact 20 of the sensor part S1 and the contact 20 of the sensor part S2 are disposed in parallel to each other and the both tips thereof are disposed on the shared sensing surface.

The tactile sensor 2 is slid while being pressed to the measuring object O. This allows each of the sensor parts S1 and S2 to detect the surface shape of the measuring object O. The two contacts 20 of the sensor parts S1 and S2 are disposed away from each other by a predetermined distance, and thus the cycles of ruggedness of the measuring object O measured by the sensor parts S1 and S2 are shifted by the distance. Based on the shift, the moved distance and velocity of the tactile sensor 2 to the measuring object O can be measured.

Setting different elastic moduli for the suspensions 30 of the sensor parts S1 and S2 allows the sensor parts S1 and S2 to perform measurement in different ranges. As a result, a single unit of the tactile sensor 2 can perform measurement in a wider range.

The tactile sensor 2 of the embodiment includes two sensor parts of the sensor parts S1 and S2. However, a tactile sensor may be configured to include three sensor parts or more.

Third Embodiment

Figure 9:
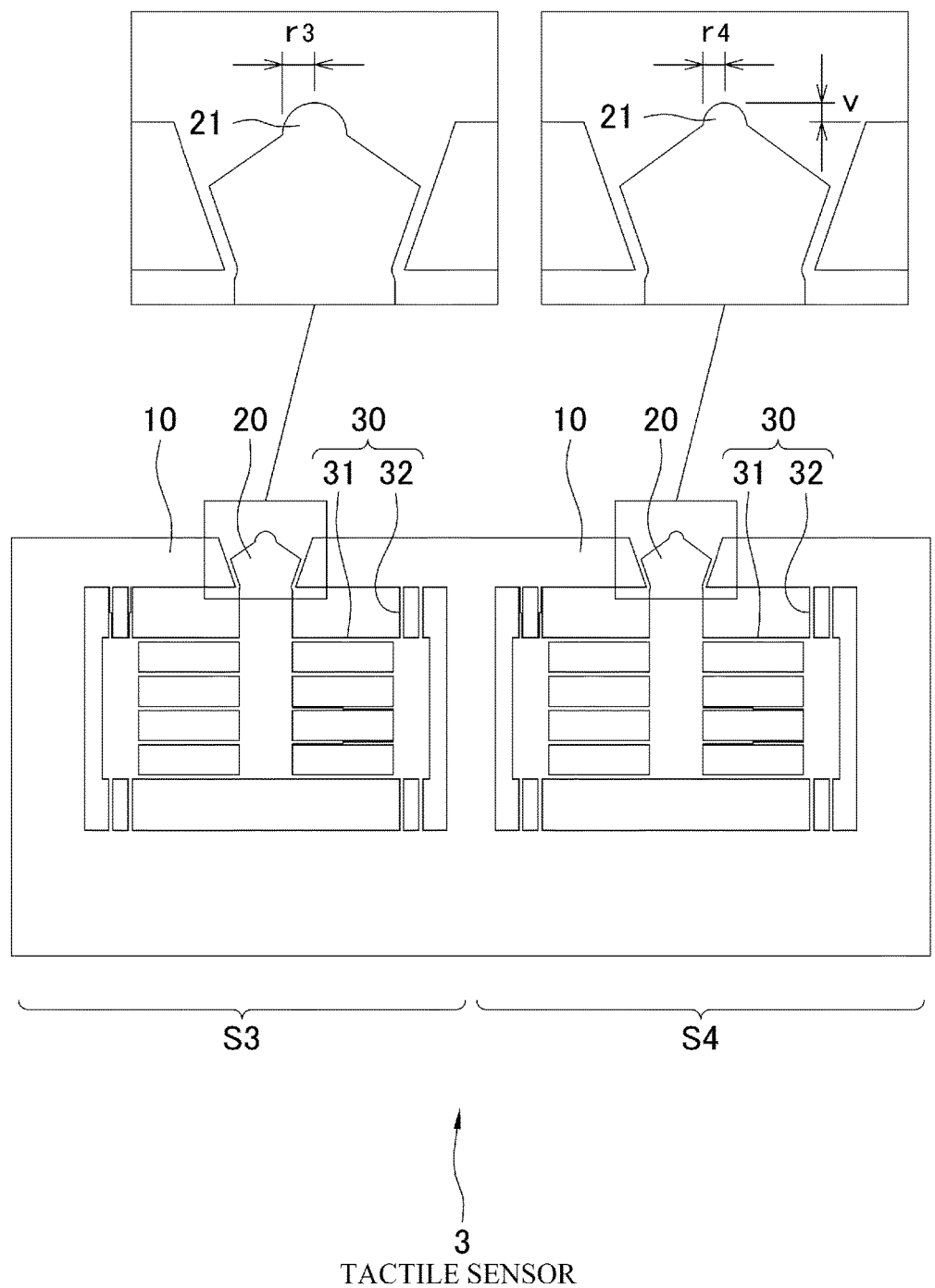
FIG. 9 shows a plan view of a tactile sensor of the third embodiment of the invention.

As shown in FIG. 9, a tactile sensor 3 of the third embodiment of the invention includes two sensor parts of a sensor part S3 and a sensor part S4. Each of the sensor parts S3 and S4 basically has the same configuration as the sensor S of the tactile sensor 1 of the first embodiment, and thus the same codes are attached to the same members and the description thereof is omitted herein.

As a feature of the tactile sensor 3 of the embodiment, the tips of the contact 20 of the sensor part S3 and the contact 20 of the sensor part S4 are formed in circular arcs having different radii. That is, a contact part 21 having a semicircular shape with a radius $r_3$ is formed on the tip of the contact 20 of the sensor part S3, while a contact part 21 having a semicircular shape with a radius $r_4$ which is smaller than the radius $r_3$ is formed on the tip of the contact 20 of the sensor part S4. The both contacts 20 are disposed so as to project by the same projection distance v from the reference surface 11.

The radii $r_3$ and $r_4$ of the contact parts 21 and the projection distance v of the contacts 20 are not limited, and may be set in accordance with the measuring object O and/or the purpose of the measurement. For example, the radius $r_3$ is set to 100 μm, the radius $r_4$ is set to 50 μm, and the projection distance v is set to 50 μm.

Method for Detecting Surface Roughness

Next, the method for detecting surface roughness of a measuring object by use of the tactile sensor 3 is described.

As show in FIG. 10A, the surface shape of the measuring object O may have swell components of large wavelengths and fine components of short wavelengths. The sensing surface of the tactile sensor 3 is slid along the surface of the measuring object O while being pressed to the surface of the measuring object O. This displaces each of the contacts 20 of the sensor parts S3 and S4 in the pressing direction along the ruggedness on the surface of the measuring object O.

The contact 20 is displaced following ruggedness of a comparable wavelength band to a radius of the contact part 21. That is, the contact 20 having the contact part 21 with the large radius $r_3$ is displaced following ruggedness of a long wavelength band, and the contact 20 having the contact part 21 with the small radius $r_4$ is displaced following ruggedness of a combination of the long wavelength band and a short wavelength band.

Therefore, as shown in FIG. 10B, the sensor part S3 including the contact 20 having the contact part 21 with the large radius $r_3$ can measure a spatial waveform of the long wavelength band (low frequency band) free from the short wavelength band (high frequency band). That is, the sensor part S3 can extract just the swell components of the surface shape of the measuring object O.

As shown in FIG. 10C, the sensor part S4 including the contact 20 having the contact part 21 with the small radius $r_4$ can measure a spatial waveform of the combination of the long wavelength band (low frequency band) and the short wavelength band (high frequency band). That is, the sensor part S4 can extract the waveform combined with the swell components and the fine components of the surface shape of the measuring object O.

Then, the spatial waveform measured by the sensor part S3 (swell components) is eliminated (subtracted) from the spatial waveform measured by the sensor part S4 (combination of swell components and fine components) so as to obtain the spatial waveform only of the short wavelength band (high frequency band), that is, the fine components of the surface shape of the measuring object O, as shown in FIG. 10D.

As described above, since the tips of the contacts 20 of the sensor parts S3 and S4 are formed in the circular arcs respectively with the different radii of the radius $r_3$ and the radius $r_4$, each of the contacts 20 is displaced following the ruggedness of the comparable wavelength band to the radius $r_3$ or the radius $r_4$ of the contact part 21. Thus, the surface shape of the measuring object O can be measured through being decomposed into respective wavelength bands by the sensor parts S3 and S4. The surface roughness of the measuring object O can be detected by use of the surface shape decomposed into respective wavelength bands as an index.

In a case where the components of the long wavelength band are many in the spatial waveform, the surface of the measuring object O can be determined to be rough, while in a case where the components of the short wavelength band are many in the spatial waveform, the surface of the measuring object O can be determined to be smooth.

A sensor may be configured to include three sensor parts or more respectively having the tips of the contacts 20 with more various kinds of radii. Such a sensor can decompose the surface shape of the measuring object O into more wavelength bands (frequency bands) so as to identify the surface roughness thereof. In a case where three sensor parts respectively having contact parts 21 with different radii are set, such a sensor can decompose a spatial waveform for measurement into three bands of a short wavelength band (high frequency band), a middle wavelength band (intermediate frequency band), and a long wavelength band (low frequency band).

Method for Detecting Flexibility

Next, the method for detecting flexibility of a measuring object by use of the tactile sensor 3 is described.

The sensing surface of the tactile sensor 3 is pressed to the surface of the measuring object O so as to detect flexibility of the measuring object O. This makes the contacts 20 of the sensor parts S3 and S4 come in contact with the surface of the measuring object O, and the contacts 20 are pressed in by the reaction force of the measuring object O.

In the embodiment, since the tips of the contacts 20 of the sensor parts S3 and S4 are formed in circular arcs respectively having different radii, the contacts 20 are differently displaced in the pressing direction in accordance with the flexibility of a measuring object O. Concretely, in a case of a hard measuring object O, both of the contact 20 having the contact part 21 with the large radius $r_3$ and the contact 20 having the contact part 21 with the small radius $r_4$ are displaced in the pressing direction by substantially the same amount. In a case of a soft measuring object O, the contact 20 having the contact part 21 with the small radius $r_4$ is easy to stick the measuring object O. Thus, compared to the contact 20 having the contact part 21 with the small radius $r_4$, the contact 20 having the contact part 21 with the large radius $r_3$ is displaced more largely in the pressing direction.

According to the result, when the tactile sensor 3 is pressed to a measuring object O, the flexibility of the measuring object O can be measured based on the difference between the displacement in the pressing direction of the contact 20 having the tip with the small radius $r_4$ and the displacement in the pressing direction of the contact 20 having the tip with the large radius $r_3$.

Fourth Embodiment

Figure 11:
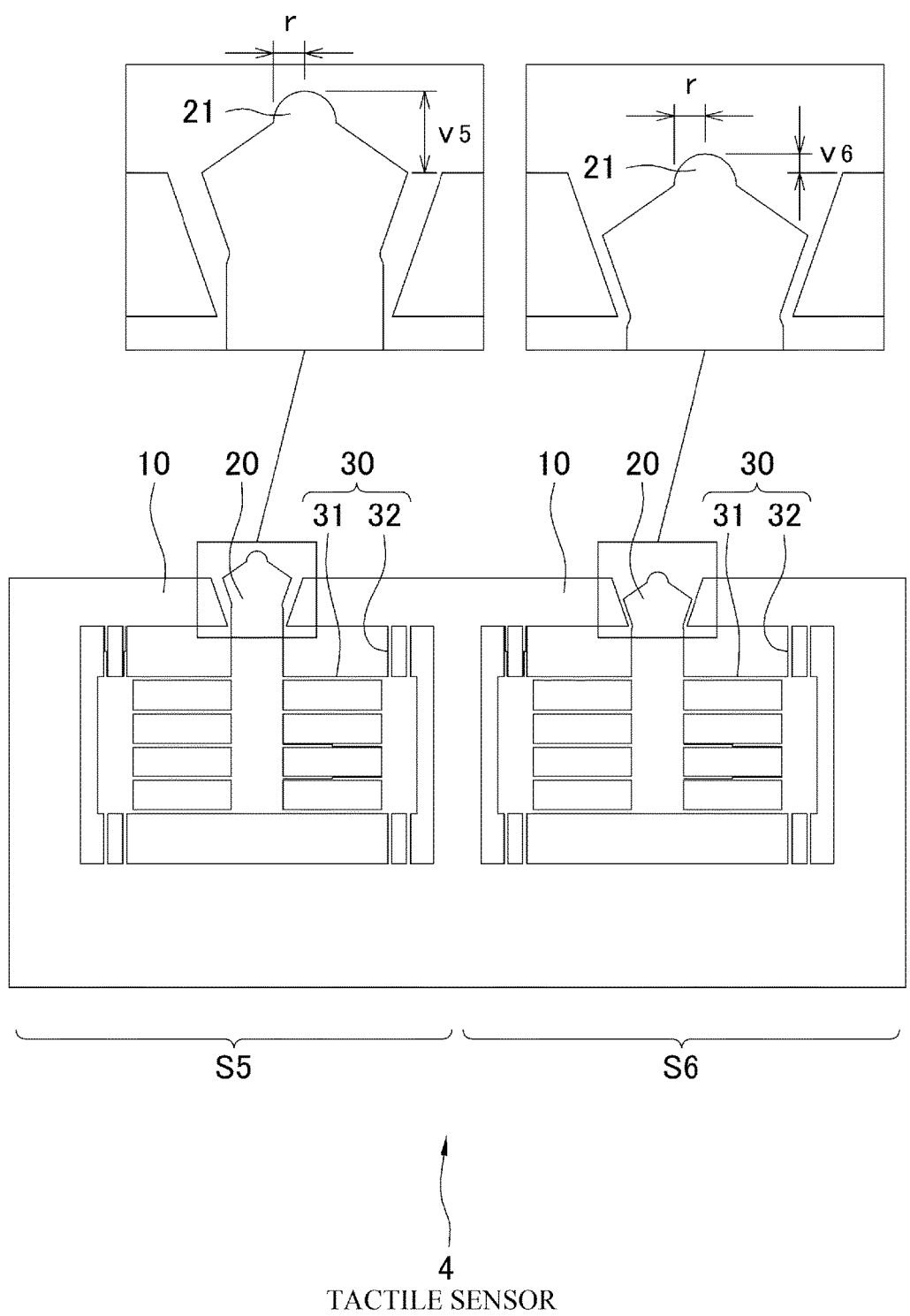
FIG. 11 shows a plan view of a tactile sensor of the fourth embodiment of the invention.

As shown in FIG. 11, a tactile sensor 4 of the fourth embodiment of the invention includes two sensor parts of a sensor part S5 and a sensor part S6. Each of the sensor parts S5 and S6 basically has the same configuration as the sensor S of the tactile sensor 1 of the first embodiment, and thus the same codes are attached to the same members and the description thereof is omitted herein.

As a feature of the tactile sensor 4 of the embodiment, the projection distances from the reference surface 11 of the contacts 20 of the sensor parts S5 and S6 are set differently. That is, the contact 20 of the sensor part S5 is disposed to project by a projection distance $v_5$, and the contact 20 of the sensor part S6 is disposed to project by a projection distance $v_6$ that is smaller than the projection distance $v_5$. The contact parts 21 of the both contacts 20 are set to have the same radius r.

The projection distances $v_5$ and $v_6$ of the contacts 20 and the radius r of the contact parts 21 are not limited, and may be set in accordance with a measuring object O and/or the purpose of the measurement. For example, the projection distance $v_5$ is set to 50 μm, the projection distance $v_6$ is set to 10 μm, and the radius r is set to 50 μm.

Method for Detecting Flexibility

Next, the method for detecting flexibility of a measuring object by use of the tactile sensor 4 is described.

The sensing surface of the tactile sensor 4 is pressed to the surface of the measuring object O so as to detect flexibility of the measuring object O. This makes the contacts 20 of the sensor parts S5 and S6 come in contact with the surface of the measuring object O, and the contacts 20 are pressed in by the reaction force of the measuring object O. The displacement respectively by the contacts 20 in the pressing direction is measured.

When the tactile sensor 4 is pressed to the measuring object O, the contacts 20 projecting from the reference surface 11 respectively press and deform the surface shape of the measuring object O. Each of the contacts 20 is displaced in the pressing direction in accordance with the balance between the elastic force generated by the strain of the first suspensions 31 and the elastic force generated by the deformation of the measuring object O. Thus, in a case of a hard measuring object O, the measuring object O hardly deforms and the contacts 20 are largely displaced in the pressing direction. In a case of a soft measuring object O, the measuring object O deforms largely and the contacts 20 are less displaced in the pressing direction.

In the embodiment, since the projection distances of the contacts 20 of the sensor parts S5 and S6 are different, the difference between the tip locations of the contacts 20 varies depending on the flexibility of the measuring object O. Concretely, in a case of a hard measuring object O, the measuring object O hardly deforms, and thus the difference between the tip locations of the contacts 20 is decreased. In a case of a soft measuring object O, the part of the measuring object O which comes in contact with the contact 20 projecting by the large projection distance $v_5$ deforms largely, and thus the difference between the tip locations of the contacts 20 is increased.

When the displacement in the pressing direction of the contact 20 measured by the sensor part S5 is $X_5$ and the displacement in the pressing direction of the contact 20 measured by the sensor part S6 is $X_6$, the difference between the tip locations of the contacts 20, that is, a strain ΔZ generated in the measuring object O, is calculated based on Formula 2 below. The flexibility of the measuring object O can be measured by use of the strain ΔZ as an index.

$$\Delta Z=(v_5-v_6)-(X_5-X_6) \qquad \text{Formula 2}$$

As above, the flexibility of the measuring object O can be measured through comparison between a displacement $X_5$ in the pressing direction of the contact 20 projecting by the large projection distance $v_5$ and a displacement $X_6$ in the pressing direction of the contact 20 projecting by the small projection distance $v_6$.

Method for Detecting Frictional Force

Next, the method for detecting frictional force of a measuring object by use of the tactile sensor 4 is described.

The sensing surface of the tactile sensor 4 is slid along the surface of the measuring object O while being pressed to the surface of the measuring object O to detect frictional force of the measuring object O. This makes the contacts 20 of the sensor parts S5 and S6 come in contact with the surface of the surface of the measuring object O, and the contacts 20 are pressed in by the reaction force of the measuring object O. Further, the contacts 20 of the sensor parts S5 and S6 are also displaced in the side slippage direction by the frictional force generated between each of the contacts 20 and the measuring object O. The displacement in the pressing direction and the displacement in the side slippage direction of each of the contacts 20 are measured.

Since the contacts 20 of the sensor parts S5 and S6 respectively project by different projection distances, the contacts 20 can apply force differently to the measuring object O. Thus, each of the sensor parts S5 and S6 can measure the frictional force when a different contact surface pressure is applied to the measuring object O.

Concretely, the contact 20 projecting by the large projection distance $v_5$ can apply a large contact surface pressure to the measuring object O, and thus the sensor part S5 can measure the frictional force when a large contact surface pressure is applied. The contact 20 projecting by the small projection distance $v_6$ can apply a small contact surface pressure to the measuring object O, and thus the sensor part S6 can measure the frictional force when a small contact surface pressure is applied.

Comparing the cases when the measuring object O is slid strongly and lightly, the shape and properties of the surface of the measuring object O may be changed and thus the frictional force and a touch feeling may be changed. The different frictional forces and touch feelings when the measuring object O is slid strongly and lightly can be measured simultaneously.

Other Embodiments

In the embodiments described above, the suspension 30 includes the plurality of first suspensions 31 disposed horizontally to the sensing surface and the plurality of second suspensions 32 disposed vertically to the sensing surface.

However other configurations may be set. In an example, suspensions may be disposed obliquely to the sensing surface.

Moreover, a displacement detector to detect the displacement of the contact 20 is not limited to a piezoresistor. In an example, a displacement detector may be configured to detect electrostatic capacitance between the contact 20 and the frame 10 by utilizing the change in distance between the frame 10 and the contact 20 due to the displacement of the contact 20.

Further, the tip of the contact 20 may be formed in a different shape, not limited to a circular arc shape. For example, the tip may be formed in a tip-sharpened needle or wave shape, or asymmetrically. Alternatively, the tip of the contact 20 may be formed in a hook shape so as to be easily caught by a measuring object in a case of measuring an unsmooth feeling of a measuring object as an important parameter.

A contacting part formed in a different shape from the contacting face 12 of the embodiments described above may be set so as to limit excessive displacement of the contact 20. The contacting part may be disposed so as to face the contact 20 apart by a prescribed gap width. That is, the contacting part may be configured to limit only the excessive displacement of the contact 20 in the pressing direction, or may be configured to limit only the excessive displacement of the contact 20 in the side slippage direction.

Further, in order to limit excessive displacement of the contact 20 in a thickness direction of the substrate B, a plate such as a glass plate may be attached to each of a front face and a back face of the substrate B with a prescribed gap distance to each of a front face and a back face of the contact 20.

EXAMPLE

Detection Test

A test for detecting displacement of the contact 20 is performed by use of the tactile sensor 1 of the first embodiment described above.

The tactile sensor 1 is fixed horizontally (the sensing surface disposed vertically). A voltage Vdd respectively applied to the first strain detection element 41 and the second strain detection element 42 is set to 10V. A handicraft cutting mat is used as a measuring object O. The act of sliding a side face of the handicraft cutting mat while pressing the side face to the sensing surface of the tactile sensor 1 is repeated three times.

Figure 12:
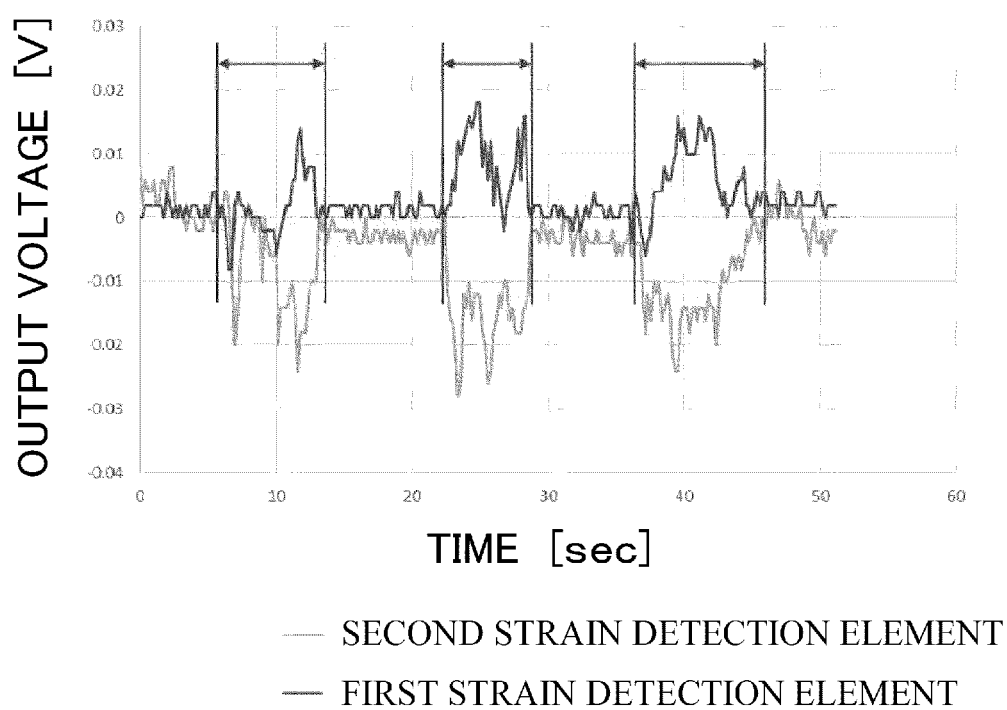
FIG. 12 graphically shows temporal change of output voltages of a first strain detection element and a second strain detection element in a detection test.

FIG. 12 shows temporal change of a voltage Vout output by the circuit including the first strain detection element 41 and a voltage Vout output by the circuit including the second strain detection element 42. FIG. 12 shows change of the output voltage detected by the first strain detection element 41 that detects the displacement of the contact 20 in the pressing direction and also of the output voltage detected by the second strain detection element 42 that detects the displacement of the contact 20 in the side slippage direction. The result shows that the first strain detection element 41 and the second strain detection element 42 can detect the displacement of the contact 20 in the pressing direction and the displacement in the side slippage direction on the same time-axis.

Test for Evaluating Touch Feeling

A test for evaluating a touch feeling is performed by use of the tactile sensor 3 of the third embodiment described above.

The radius $r_3$ of the contact part 21 of the sensor part S3 is set to 100 μm, the radius $r_4$ of the contact part 21 of the sensor part S4 is set to 50 μm, and the projection distance v of the both contacts 20 is set to 50 μm. Further, the voltage Vdd respectively applied to the first strain detection element 41 and the second strain detection element 42 is set to 10V.

Two types of sheets of copy paper and Japanese straw paper are prepared for use as measuring objects. For a person, the copy paper feels smooth, while the straw paper feels rough. The sensing surface of the tactile sensor 3 is slid at a constant velocity (1 mm/sec) while being pressed to each of the sheets for use as a measuring object.

Figure 13:
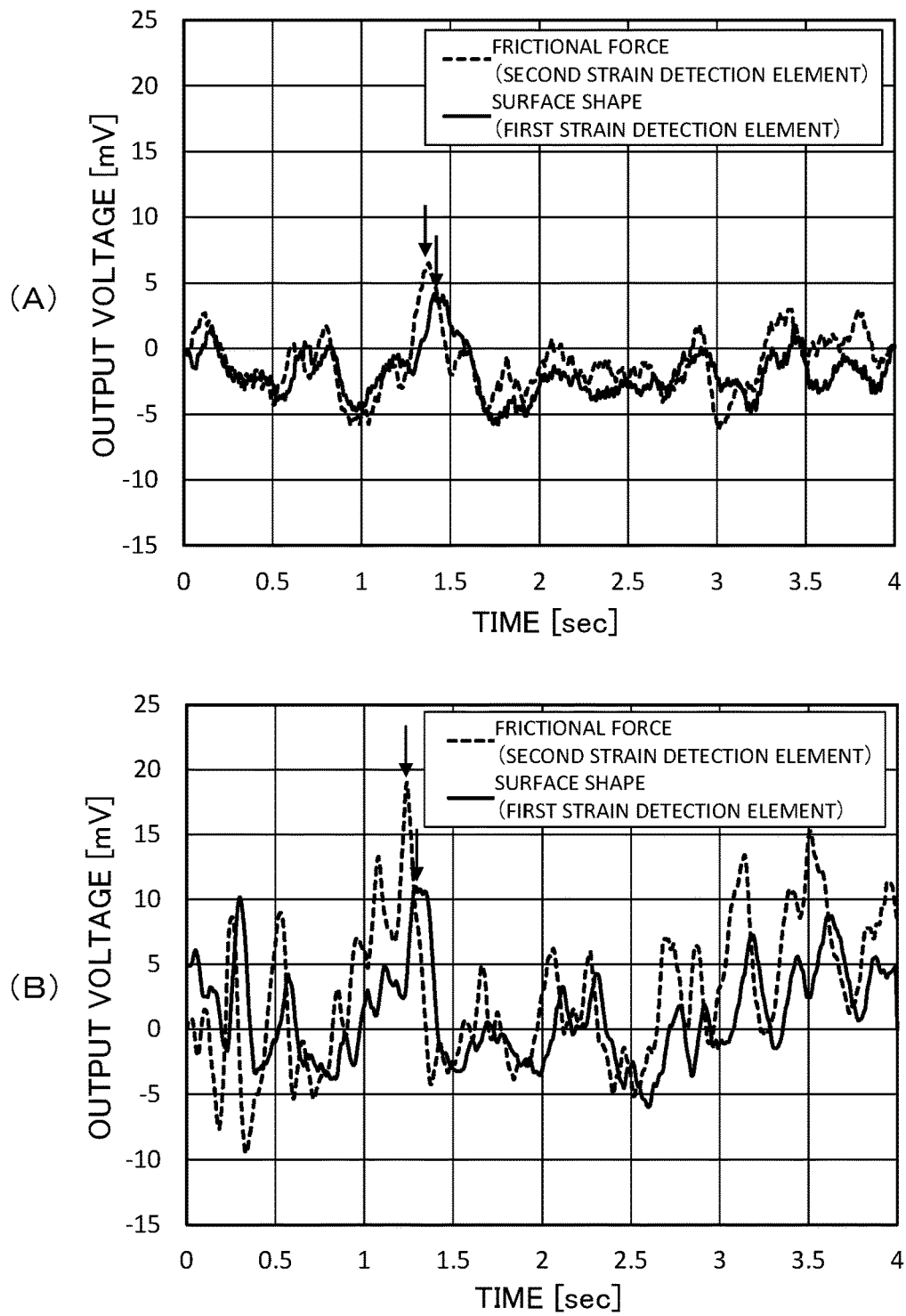
FIG. 13 graphically shows temporal change of output voltages of the first strain detection element and the second strain detection element in a test for evaluating a touch feeling.

FIG. 13 shows temporal change of a voltage Vout output by the circuit including the first strain detection element 41 of the sensor part S4 and a voltage Vout output by the circuit including the second strain detection element 42 of the sensor part S4. FIG. 13A shows a case of copy paper for use as a measuring object, while FIG. 13B shows a case of straw paper for use as a measuring object. The output voltage by the first strain detection element 41 shows the surface shape of a measuring object. The output voltage by the second strain detection element 42 shows the frictional force of a measuring object. The horizontal axis represents a time axis, and is also synonymous with a position coordinate on the surface of a measuring object because the tactile sensor 3 is moved at a constant velocity to the measuring object. As described above, the tactile sensor 3 can acquire data rows including surface shapes and frictional forces of a measuring object.

The output voltage of 5 mV by the first strain detection element 41 corresponds to the amplitude of a surface shape of approximately 10 μm. FIG. 13 shows that the tactile sensor 3 can measure the amplitude of a surface shape by the resolution of approximately 1 μm. In a case of straw paper (FIG. 13B), both of the amplitude of the surface shape thereof and the amplitude of the frictional force thereof are larger compared to those of copy paper (FIG. 13A). This shows that the surface of the straw paper has larger ruggedness.

In addition, FIG. 13 shows that in each case the waveform of the surface shape and the waveform of the frictional force are similar to each other, and the phases of them are shifted each other. The peak of the frictional force appears immediately before the peak of the surface shape. Each arrow in FIG. 13 shows an example location of the peak of the surface shape or the peak of the frictional force adjacent to the peak of the surface shape. It may be considered that this happens because the contact part 21 is caught by a projection part of a surface of a measuring object (a peak of the surface shape), and thus frictional force is increased immediately before the projection part. Conventionally, frictional force can be measured only as an average value of an entire measuring object. The tactile sensor 3 can partially measure frictional force of a measuring object. In addition, the tactile sensor 3 can measure change in frictional force as well as change in surface shape. Therefore, new knowledge as described above can be obtained.

FIG. 14 shows a scatter diagram in which the horizontal axis represents surface shape and the vertical axis represents frictional force. FIG. 14A shows a case of copy paper for use as a measuring object, while FIG. 14B shows a case of straw paper for use as a measuring object. A correlation coefficient r between surface shapes and frictional forces is calculated for each of the cases. The correlation coefficient r in a case of copy paper is 0.64, while the correlation coefficient r in a case of straw paper is 0.42. Here, the correlation coefficient r in the data rows including coupled values $\{(x_1, y_1)\}(i=1,$ 2, . . . , n) is defined based on Formula 3 below. Other definition may be used as the definition of the correlation coefficient.

$$r = \frac{\sum_{i=1}^{n}(x_i - \bar{x})(y_i - \bar{y})}{\sqrt{\sum_{i=1}^{n}(x_i - \bar{x})^2}\sqrt{\sum_{i=1}^{n}(y_i - \bar{y})^2}} \quad \text{Formula 3}$$

The values $\bar{x}$ and $\bar{y}$ respectively represent the arithmetic means of $x=\{x_1\}$ and $y=\{y_1\}$.

The correlation coefficient of the straw paper is lower than the correlation coefficient of the copy paper. The measuring object having a higher correlation coefficient can be said to feel smooth, while the measuring object having a lower correlation coefficient can be said to feel rough. As described above, a touch feeling can be quantified by use of a correlation coefficient between surface shapes and frictional forces as an index.

As described above, the phases of the waveform of the surface shapes and the waveform of the frictional forces are shifted each other. The phases of the respective waveforms are shifted by a unit of 0.01 second in the period from zero to 0.1 second to obtain the correlation coefficients between the surface shapes and the frictional forces in various phase differences. FIG. 15 shows the result. FIG. 15A shows a case of copy paper for use as a measuring object, while FIG. 15B shows a case of straw paper for use as a measuring object.

FIG. 15 shows that in a case of no phase shifted the correlation coefficient of copy paper (FIG. 15A) is higher. However, the peak value of the correlation coefficient of straw paper (FIG. 15B) is higher. The phase difference of the peak value of the correlation coefficient of copy paper is different from that of the straw paper. The correlation coefficient of straw paper has a peak with a larger phase difference compared to the case of copy paper. The measuring object having a smaller phase difference at a peak of a correlation coefficient can be said to feel smooth, while the measuring object having a larger phase difference at a peak of a correlation coefficient can be said to feel rough. As described above, a touch feeling can be quantified by use of a phase difference at a peak of a correlation coefficient as an index.

FIG. 16 shows differential spatial frequency distribution with regard to surface shapes and frictional forces. FIG. 16A shows a case of copy paper for use as a measuring object, while FIG. 16B shows a case of straw paper for use as a measuring object. Information regarding a touch feeling is considered to be included in the similarity and the phase difference with regard to the waveforms of surface shapes and the waveforms of frictional forces. Thus, attention is focused on the differential spatial frequency distribution showing the similarity and the phase difference. The differential spatial frequency distribution is obtained in such a manner that a differential waveform is obtained by removing a signal waveform of frictional force from a signal waveform of a surface shape, and then a Fourier transformation is applied to the obtained differential waveform.

The distribution of a case of copy paper (FIG. 16A) shows that many low frequency components are included, while less high frequency components are included. The reason of the distribution is that the copy paper is made from relatively fine fibers and has a smooth surface shape, and thus the both waveforms themselves of the surface shapes and the frictional forces have less high frequency components. Another reason is that the similarity between the waveforms of the surface shapes and the frictional forces is high, and the phase difference between them is small. The distribution of a case of straw paper (FIG. 16B) shows that high frequency components are included, as well as low frequency components. The reason of the distribution is that the waveforms themselves of the surface shapes and the fictional forces have many high frequency components because the straw paper is made from relatively coarse fibers and thus the contact part 21 receives the frictional force generated when the contact part 21 is occasionally caught by such coarse fibers. Another reason is that the similarity between the waveforms of the surface shapes and the frictional forces is low, and the phase difference between them is large. Therefore, it can be said that the measuring object having less high frequency components feels smooth, while the measuring object having more high frequency components feels rough. As described above, a touch feeling can be evaluated by use of differential spatial frequency distribution with regard to surface shapes and frictional forces as an index.

In the test for evaluating a touch feeling described above, paper is used as a measuring object. However, other material such as hair or skin is available as a measuring object.

REFERENCE SIGNS LIST 1 to 4 tactile sensor
B substrate
S sensor part
10 frame
11 reference surface
12 contacting face
20 contact
21 contact part
22 contacted face
30 suspension
31 first suspension(s)
32 second suspension(s)
33 island(s)
41 first strain detection element(s)
42 second strain detection element(s)

The invention claimed is:
1. A tactile sensor, comprising
a sensor part that is formed in a substrate, wherein
the sensor part includes:
a frame that includes a side part of the substrate;
a contact that is disposed in parallel to the substrate so that a tip of the contact projects from a side face of the substrate;
a suspension that supports the contact to the frame; and
a displacement detector that detects displacement of the contact.
2. The tactile sensor according to claim 1, wherein
the suspension includes:
a first suspension that allows the contact to be displaced vertically to the side face of the substrate; and
a second suspension that allows the contact to be displaced horizontally to the side face of the substrate, and
the displacement detector includes:
a first strain detection element that detects strain of the first suspension; and
a second strain detection element that detects strain of the second suspension.
3. The tactile sensor according to claim 1, wherein
the tip of the contact is formed in a circular arc.

4. The tactile sensor according to claim 1, wherein
a contacting part that faces the contact apart by a predetermined gap width is formed on the frame.

5. The tactile sensor according to claim 1, wherein
a pair of contacting faces is formed on the frame so as to sandwich the contact,
a pair of contacted faces that faces the pair of contacting faces is formed on the contact,
the pair of contacting faces is inclined to the side face of the substrate so as to spread toward the side face, and
the pair of contacted faces is disposed in parallel to the pair of contacting faces apart by a predetermined gap width.

6. The tactile sensor according to claim 1, the tactile sensor comprising
a plurality of the sensor parts.

7. The tactile sensor according to claim 6, wherein
the tips of the contacts of the plurality of sensor parts are formed respectively in circular arcs having different radii.

8. The tactile sensor according to claim 6, wherein
the plurality of sensor parts are disposed so that the contacts project from the side face of the substrate by different projection distance.

9. A method of using the tactile sensor according to claim 1 for evaluating a touch feeling of a measuring object based on data rows including surface shapes and frictional forces of the measuring object, the method comprising:
calculating a correlation coefficient between the surface shapes and the frictional forces; and
evaluating the touch feeling by use of the correlation coefficient as an index.

10. A method of using the tactile sensor according to claim 1 for evaluating a touch feeling of a measuring object based on data rows including surface shapes and frictional forces of the measuring object, the method comprising:
calculating correlation coefficients between the surface shapes and the frictional forces in various phase differences; and
evaluating the touch feeling by use of one of the various phase differences at a peak of the correlation coefficient as an index.

11. A method of using the tactile sensor according to claim 1 for evaluating a touch feeling of a measuring object based on data rows including surface shapes and frictional forces of the measuring object, the method comprising:
obtaining differential spatial frequency distribution with regard to the surface shapes and the frictional forces; and
evaluating the touch feeling by use of the differential spatial frequency distribution as an index.

* * * * *